April 1, 1958     M. J. BARRY ET AL     2,829,113
PRODUCTION OF NITROGEN AND HYDROGEN FOR AMMONIA SYNTHESIS
Filed Oct. 14, 1953
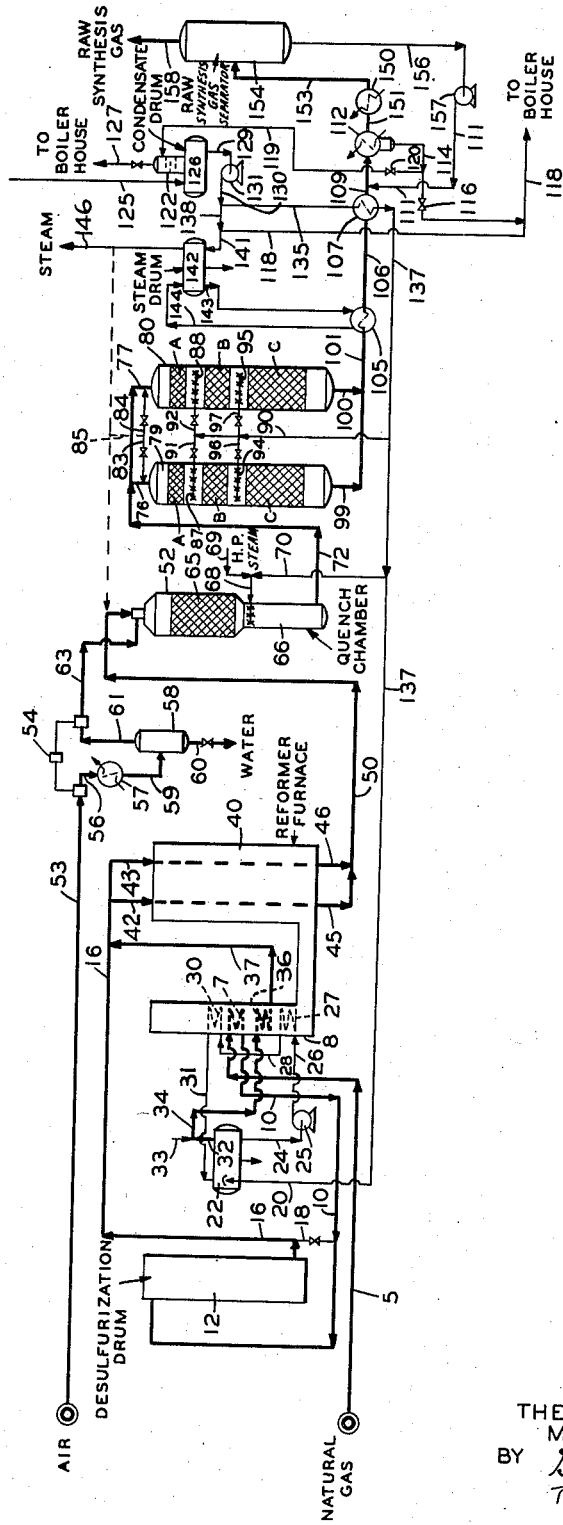
INVENTORS
THEODORE S. WILLIAMS
MARTIN J. BARRY
BY *D. H. Palmer*
*T. C. Virgil*
ATTORNEYS

United States Patent Office 2,829,113
Patented Apr. 1, 1958

2,829,113

PRODUCTION OF NITROGEN AND HYDROGEN FOR AMMONIA SYNTHESIS

Martin J. Barry, Ridgewood, and Theodore S. Williams, Asbury Park, N. J., assignors to The M. W. Kellogg Company, Jersey City, N. J., a corporation of Delaware Application October 14, 1953, Serial No. 385,916

11 Claims. (Cl. 252—376)

This invention relates to an improved process for making hydrogen, and more particularly, it pertains to a process for making hydrogen from a hydrocarbon material for use in the synthesis of ammonia.

The demand for hydrogen at present is increasing, because of the greater use of synthetic processes in which it is used. The cost to produce hydrogen is an important item, consequently, effort is being made to reduce costs and improve the efficiency of the methods employed. In some cases, hydrogen is produced with another gaseous material as a product of the same operation, such as for example, in producing feed gases for hydrocarbon and ammonia synthesis. In the case of preparing a feed gas for ammonia synthesis, the hydrogen and nitrogen are obtained as the product of the same process, and this gaseous material is compressed to the desired pressure level for reaction. The expense of compressing the feed gas is great, consequently, it is advantageous to produce the material under superatmospheric conditions in order to effect later a saving in compression costs. Certain reactions involved in the production of this feed gas are adversely influenced by pressure, consequently, the operation is conducted under controlled conditions of temperature, etc., in order to counteract at least in part the undesirable influences of pressure.

An object of this invention is to provide an improved method for producing hydrogen.

Another object of this invention is to provide an improved method for the manufacture of hydrogen and nitrogen containing gas which can be used for the synthesis of ammonia.

Other objects and advantages will become apparent from the following explanation and description thereof.

By means of this invention, a process is contemplated which comprises contacting a carbon monoxide containing gas with a series of catalyst beds at an elevated temperature and injecting water between the beds in order to regulate the reaction temperature at which the carbon monoxide is reacted with steam to produce hydrogen by means of the water gas shift reaction. The water employed for the injection between the catalyst beds is in a liquid condition. This feature is particularly desirable, because it makes possible the employment of smaller quantities of water by virtue of the quantity of heat which can be absorbed in vaporizing the water to a gaseous state. Furthermore, the injection of water between catalyst beds can serve as a means of furnishing water for the reaction between carbon monoxide and steam. In view that the extent of reaction between steam and carbon monoxide is great during the initial stages of the reaction, it is contemplated employing a multiple-catalyst bed system in which the reactant materials are contacted with varying volumes of catalyst such that a relatively small volume of catalyst is employed in the initial bed and the reaction bed size increases as the reaction proceeds. In a fixed bed system employing three beds, it is visualized employing spaced catalyst beds, each bed increasing in volume with the flow of reactant materials such that the relative volumes of the second and third beds to the initial bed stand in the ratio of about 1.1 to 2.75:1 and 2 to 6:1, respectively.

It is also contemplated employing a process for producing hydrogen which is substantially more economical to operate than any method known heretofore. In this improved process, it is contemplated, as previously mentioned, to contact the carbon monoxide containing gas with a series of water gas shift catalyst beds, with liquid water injection between the beds in order to regulate the temperature at which the carbon monoxide is reacted with steam to produce hydrogen. The product thus produced is then cooled so as to condense a portion of the steam contained therein. The condensed water is separated from the product stream and then the remaining stream is cooled at a lower temperature so as to condense substantially more of the steam. The condensed water from the last cooling step is separated from the product, and it is recycled to the product stream which is being passed to the first cooling step. By means of the technique of recycling water which is condensed at a lower temperature to the product stream which exists at a significantly higher temperature, it is possible to effect two purposes, namely, (1) cool the product stream and thus impose a smaller cooling duty on the first cooling step, and (2) produce water condensate at a significantly higher temperature such that it can be utilized in the production of more steam with less expense for the manufacture of same.

The carbon monoxide which is utilized in the water gas shift reaction may be obtained by reforming a hydrocarbon material. The operation is conducted by contacting the hydrocarbon as a gaseous material with a reforming catalyst in the presence of steam. The product material containing carbon monoxide is then further processed in the water gas shift reaction as previously described.

In the case of manufacturing a synthesis gas for ammonia production, it is desirable to obtain a product which exists under pressure in order to effect a substantial saving in the cost of compressing the synthesis gas to a pressure at which ammonia is produced. In this regard, it is contemplated operating the process, namely, the water gas shift reaction, with or without the reforming step, under pressure in order that the product thus produced can be used in the ammonia synthesis reaction, after it has been further compressed to a suitable pressure level. In view of the volume of gas employed as a feed material to the ammonia reaction, a considerable saving is effected when this gas material is produced under a superatmospheric pressure.

In the production of feed gas for ammonia synthesis, it is particularly desirable to conduct the reforming of hydrocarbon material in a two-step process when operating under a superatmospheric pressure. In the first step, the hydrocarbon material is heated to a suitable temperature, and then reformed in the presence of steam such that the hydrocarbon undergoes about 60 to about 80% conversion, based on the fresh feed. A low temperature does not favor the equilibrium of the desired reforming reaction, nor does it favor the rate of reaction; however, the low temperature is used in the first reforming step in order that the heat contained in the product therefrom is sufficient to furnish the required preheat for attaining the desired temperature in the second reforming zone. It is not important that complete reforming is not acomplished in the first reforming step, because this result is accomplished in the second reforming step. The overall effect of both stages is endothermic, hence, reforming in the first stage is essentially a preheat step for the second stage. By injecting air into the second stage, combustion of hydrocarbon takes place and the heat thus generated is sufficient for the requirements of sensible and reaction heat. The temperature of the first reforming step is conducted, generally, at a temperature of about 1250° to about 1450° F., preferably about 1325° to about 1375° F. While such temperatures are not the best from the standpoint of reforming, nevertheless, they are preferred from the standpoint of producing the ammonia synthesis gas under superatmospheric conditions. In the second reforming step, the product from the first reforming step is combined with an oxygen containing gas, and the conditions are such that the hydrocarbon material is substantially all converted. The temperature employed in the second stage is governed by the stability of catalyst activity. Generally, a temperature of about 1500° to about 1900° F., preferably about 1650° to about 1750° F., is used. The oxygen containing gas employed for this operation can be air, pure oxygen, etc., although in producing ammonia feed gas, air is employed to furnish the required nitrogen, hence it is preferred.

The water gas shift reaction involves the reaction between steam and carbon monoxide to produce hydrogen and carbon dioxide. In this invention, this reaction is conducted at a temperature of about 650° to about 850° F., preferably about 700° to about 750° F. The pressure of the system for the purposes of this invention is about 15 to about 125 p. s. i. g., preferably about 50 to about 75 p. s. i. g. The relative quantities of the reactant materials are measured on a volumetric basis, and generally, about 3 to about 10:1 of steam to carbon monoxide on a ratio basis are employed. The catalyst to be used for this reaction is well known, and it can be essentially any polyvalent metal or oxide thereof. Usually, however, an oxide of a group VIII metal having an atomic number not greater than 28 and an oxide of a metal of the left-hand element of group VI are used. The catalysts include, for example, iron oxide, nickel oxide, cobalt oxide, chromia, molybdena, tungsten oxide, etc. The quantity of water gas shift catalyst which is used in the reaction is determined on a volumetric basis, which is measured as the volume of reactant materials (measured at 60° F. and 760 mm.) fed to the reaction zone on an hourly basis per unit volume of catalytic material which is present therein. Generally, a volumetric space velocity of about 500 to about 3000 $V_0/hr./V_c$, preferably about 1000 to about 1500 $V_0/hr./V_c$, is used. The quantity of liquid water which is injected between the reaction beds in the water gas shift reaction zone will be determined by the temperature used, the relative volumes of the catalyst beds and the quantity of carbon monoxide which is to be reacted. Since the water gas shift reaction proceeds more rapidly upon first being contacted with the catalyst material, it is contemplated using a relatively smaller initial bed than those following, and accordingly, the quantity of liquid water being injected into the reactant stream which emerges from contact with the first catalyst bed will be about .005 to about .02 pound of water, preferably about .01 to about .015 pound of water per cubic foot of carbon monoxide (measured at 60° F. and 760 mm., based on inlet conditions. The injection of water at points between the following beds can be effected in the amounts just stated above, or in equal quantities as injected above.

The first reforming stage is effected by means of a reforming furnace having a series of tubes containing reforming catalyst. In the furnace, the hydrocarbon material is heated to the desired reaction temperature, and it is then converted to the desired products by means of the catalytic material which is present in the tubes. Steam is also employed, generally, on a volumetric ratio of about 1 to about 4:1 of steam to hydrocarbon material. As previously indicated, the reforming operation is conducted at a superatmospheric level of about 15 to about 125 p. s. i. g., preferably about 50 to about 75 p. s. i. g. The pressure used in the first reforming stage is essentially the same as that used in the second stage. An important consideration with regard to pressure is that there is a structural limitation of the furnace, which controls the practical pressure which can be used at the temperature involved in this step of the process. The reforming catalyst employed for this reaction can be any one of the well-known types, for example, a metal of group VIII having an atomic number not greater than 28 and/or an oxide thereof, a metal of a left-hand element of group VI and/or an oxide thereof. Specific examples of reforming catalysts which can be used in this reforming step are nickel, nickel oxide, cobalt, cobalt oxide, chromia, molybdenum oxide, tungsten oxide, etc. The catalyst used in the second reforming stage can be any one or more enumerated above for the first reforming step. The relative quantities of reactant materials and catalyst is determined on a volumetric space velocity, which was defined hereinabove, and generally, this volumetric space velocity is about 1000 to about 6000 $V_0/hr./V_c$, preferably about 2000 to about 3000 $V_0/hr./V_c$.

The reactant material for the second reforming step will have a composition which is determined by the conditions used in the first reforming operation, except that an oxygen containing gas, e. g., oxygen or air, is combined with the product material from the first reforming operation. The quantity of air employed in the second reforming step is determined by the amount of nitrogen which is necessary for producing the feed gas for the ammonia synthesis reaction. Further, the quantity of air used in this step is determined on the basis of the amount of heat of combustion which is necessary to attain a greater temperature than exists in the first reforming step and thus complete the reforming reaction. Generally, the quantity of oxygen containing gas to be used for the second reforming step is determined by the amount of product material which is fed to the second reforming zone, on a volumetric basis. Generally, about 0.03 to about 0.1:1, on a volumetric ratio basis, of oxygen to product gas from the first reforming zone are employed. The volumetric space velocity, measured as the volume of reactant material per hour which is charged to the second reforming zone per volume of reforming catalyst present therein, is generally about 1000 to about 5000 $V_0/hr./V_c$.

The hydrocarbon material which is employed for the production of hydrogen can be any hydrocarbon material which is capable of being vaporized or gasified and reacted under the conditions existing in the first and second reforming zones. For this purpose, a light hydrocarbon material can be employed, or one which has not more than about seven carbon atoms in the molecule, preferably not more than three carbon atoms in the molecule. Specific examples of hydrocarbon materials which can be used in this process are methane, ethane, propane, butane, hexane, etc.

In order to provide a better understanding of the present invention, reference will be had to a specific example thereof.

In the figure, natural gas at a temperature of 60° F. and a pressure of 125 p. s. i. g. is introduced via line 5 at the rate and composition indicated below:

| Components: | Lb./hr. |
|---|---|
| $CH_4$ | 5,793 |
| $CO_2$ | 66 |
| $C_2H_6$ | 486 |
| $C_3H_8$ | 119 |
| $N_2+O_2$ | 55 |
| Total | 6,519 |

The natural gas is fed into a coil 7 of a furnace stack 8, by means of which it attains a temperature of 850° F. at a pressure of 95 p. s. i. g. The heated natural gas is discharged from the coil 7 and thence it flows through a line 10 which is connected to a suitable desulfurizer 12. The desulfurized natural gas is discharged from the desulfurizer 12 via a line 16. In the event that the natural gas or hydrocarbon material is substantially free of sulfur compounds, the heated natural gas stream may by-pass the desulfurization drum by flowing from line 10 via a valved by-pass 18 and thence into line 16.

The steam employed in reforming of the natural gas stream is generated by introducing 12,810 pounds per hour of hot water condensate at a temperature of 291° F. via a line 20 into the bottom of one end of a steam drum 22. Hot water is withdrawn from the other end of the steam drum 22 via a line 24, and it is transferred by means of a pump 25 and a line 26 to a coil 27 which is located in the bottom part of furnace stack 8. The heated material emerges from coil 27 by means of a line 28, and then enters another coil 30 in the same furnace stack 8 where it is further heated. The stream produced in this manner is discharged from coil 30, and it is returned to the top part of steam drum 22 via a line 31. The steam collects in drum 22 and it is discharged from the top thereof by means of a line 32 for use in the reforming step. 12,200 pounds per hour of steam is withdrawn from drum 22 via line 32, and it is then joined with 3730 pounds per hour of high pressure steam which is supplied by means of line 33. The combined streams of steam pass through line 34 and then they enter a coil 36 which is situated in furnace stack 8. As a result of heating, the steam attains a temperature of 1171° F., and it is discharged from the coil 36 by means of a line 37, which in turn then joins line 16, in which there is flowing the desulfurized natural gas. The combined streams of steam and natural gas exist at a temperature of 1000° F. and the pressure is 93 p. s. i. g. before entering the reformer furnace 40. The reformer furnace is illustrated schematically in the drawing, however, it is comprised of 170 three inch I. D. tubes containing 15,000 pounds of nickel catalyst having about 20% nickel oxide on alumina. This catalyst occupies a volume of 204 cubic feet. The stream of natural gas and steam is divided so that parallel streams of equal amounts of reactant materials are processed via lines 42 and 43. The reformed product from furnace 40 emerges from exit lines 45 and 46 at a temperature of 1410° F. and a pressure of 70 p. s. i. g. The feed to the reformer furnace 40 had the following composition and in amounts specified below:

| Components: | Lb./hr. |
|---|---|
| $N_2+O_2$ | 55 |
| $CH_4$ | 5,793 |
| $CO_2$ | 66 |
| $C_2H_6$ | 486 |
| $C_3H_8$ | 119 |
| $H_2O$ | 15,930 |
| Total | 22,449 |

As a result of being reformed in furnace 40, the reaction product has the composition and the amounts specified below:

| Components: | Lb./hr. |
|---|---|
| $H_2$ | 1,864 |
| $N_2$ | 42 |
| CO | 4,816 |
| $CH_4$ | 1,936 |
| $CO_2$ | 4,888 |
| $H_2O$ | 8,903 |
| Total | 22,449 |

The reaction product in discharge lines 45 and 46 of furnace 40 are combined as a single stream by means of line 50, and it is then charged to a combustion chamber 52. The air which is required for the second reforming step is supplied via a line 53 at a temperature of 80° F. and at atmospheric pressure. This air is compressed in compressor 54, and between stages, the air is passed from one stage of compression via line 56 to a cooler 57 before being passed into a separator 58 via a line 59. In the separator any liquid which is formed upon cooling is removed from the bottom end thereof by means of a valved line 60. Gaseous material is discharged from the overhead of the separator via a line 61 before being compressed in another stage to a pressure of 90 p. s. i. g. and a temperature of 283° F. This compressed air is fed to the top of combustion chamber 52 by means of a line 63. The combustion chamber is comprised of an upper section 65 in which there is situated nickel oxide catalyst having about 20% by weight of nickel oxide on alumina. The upper section 65 of the combustion chamber has an internal diameter of 6 feet, 9 inches and the catalyst occupies 625 cubic feet, thus weighing 45,600 pounds. As a result of partial burning of the partially reformed gas, the temperature of the reaction product is at 1700° F. As a result of conversion in the nickel catalyst bed, the reaction product has the following composition in the amounts specified:

| Components: | Lb./hr. |
|---|---|
| $H_2$ | 2,110 |
| $N_2$ | 12,184 |
| CO | 7,983 |
| A | 224 |
| $CH_4$ | 56 |
| $CO_2$ | 5,082 |
| $H_2O$ | 10,920 |
| Total | 38,559 |

The reaction product then enters the quench chamber 66 of the combustion chamber 52. To the top part of the quench chamber there is introduced via a line 68, 4,404 pounds per hour of high pressure steam from a source 69 and 14,360 pounds per hour of liquid water at a temperature of 291° F. via a line 70. As a result of quenching, the reformed product leaves the bottom of quench chamber 66 via a line 72 at a temperature of 750° F. and a pressure of 64 p. s. i. g.

The reformed product contains appreciable quantities of carbon monoxide which can be used to produce additional quantities of hydrogen by means of the water gas shift reaction. For this purpose, the reaction product is divided so that essentially equivalent portions pass through lines 76 and 77, and thence to the top of converters 79 and 80. In each converter there is situated three beds, A, B and C, of iron oxide caatlyst. Catalyst bed A is comprised of 97 cubic feet of catalyst weighing 9000 pounds. Catalyst bed B is comprised of 155 cubic feet of catalyst weighing 14,400 pounds. Catalyst bed C is comprised of 308 cubic feet of catalyst weighing 28,600 pounds. The reactant materials entering the converters are at a temperature of 750° F., and in the event that this inlet temperature is excessive, provision is made for injecting steam through valved lines 83 and 84, which are supplied from source 85, into feed lines 76 and 77, respectively, of the converters. Between catalyst beds A and B in converters 79 and 80, there is situated distributors 87 and 88, respectively, from which liquid water is injected for the purpose of cooling the reactant materials prior to contacting catalyst bed B. The liquid water is supplied from a source 90 before being distributed through valved lines 91 and 92, and thence through distributors 87 and 88, respectively. Liquid water is injected in substantially equivalent amounts between catalyst beds A and B in each converter, at the rate of about 600 pounds per hour. Similarly, after the reactant materials have passed through catalyst bed B, they are again quenched by means of liquid water which is introduced through distributors 94 and 95. These distributors are in turn connected to valved lines 96 and 97, respectively, and they in turn are connected to supply source 90. The amount of liquid water which is injected between catalyst beds B and C is fed to each converter at the rate of about 700 pounds per hour. If it is desired, provision can be made for injecting steam between catalyst beds A and B and beds B and C for each converter, should the need arise. The respective reaction products from each of the converters is discharged from the bottoms thereof by means of lines 99 and 100, and these lines then join as a single line 101. As a result of the water gas shift reaction, the reaction product has the following composition and in the amounts specified below:

| Components: | Lb./hr. |
| --- | --- |
| $H_2$ | 2,608 |
| $N_2$ | 12,184 |
| CO | 1,008 |
| A | 224 |
| $CH_4$ | 56 |
| $CO_2$ | 16,042 |
| $H_2O$ | 27,801 |
| Total | 59,923 |

This product stream is at a temperature of 750° F. and a pressure of 61 p. s. i. g.

The reaction product leaving the water gas shift converters first passes through an exchanger or cooler 105, and the temperature is reduced to 360° F. at a pressure of 59 p. s. i. g. The cooled product passes through exchanger 105, then into a line 106, before passing into a second exchanger 107. As a result of cooling in exchanger 107, the product is at a temperature of 293° F. and a pressure of 38 p. s. i. g. The cooled product leaves the exchanger 107 via a line 109, and it is then combined with water condensate at a temperature of 100° F. at the rate of 11,100 pounds per hour which is introduced via a line 111. As a result of combining the product and the water condensate, the resultant temperature is 251° F. This combined stream is passed through a cooler 112 which decreases the temperature of the product stream to 220° F. As a result of cooling, a substantial part of the steam in the product stream is condensed, and further, the water condensate which is combined with the product stream is elevated in temperature such that the heat released by the product is utilized in heating the water which is to be employed in the manufacture of additional quantities of steam. The hot water condensate is discharged from cooler 112 by means of line 114 at the rate of 27,305 pounds per hour. This hot water condensate passes through an open valve 116 in line 114, and thence into a line 118 which transports this material to a boiler house. Alternatively, this hot liquid condensate can be passed through a line 119 containing a valve 120, and thence into a condensate drum 122. Water condensate, at a temperature of 297° F., is supplied at the rate of 48,468 pounds per hour from a source 125 and fed into section 126 of the condensate drum. The steam which is present in the condensate drum is discharged overhead by means of a valved line 127 at the rate of 3080 pounds per hour, and this material is transferred to a boiler house not shown. The condensate in section 126 is at a temperature of 230° F. and 6 p. s. i. g.; this material is withdrawn from the bottom thereof by means of a line 129, and it is pumped into another line 130 by means of pump 131. Part of the water condensate in line 130 is passed at the rate of 29,770 pounds per hour through a line 135, and thence it is passed through exchanger 107 wherein it acquires heat to raise the temperature to 291° F. The heated condensate leaves exchanger 107, and thence it passes into a supply line 137 which supplies liquid condensate to the converters, the quench chamber 66 and steam drum 22. Another portion of liquid condensate is withdrawn from line 130 at the rate of 3270 pounds per hour, and it is passed into a line 138 which then joins with line 118, which contains the hot liquid condensate from cooler 112. The total water condensate in line 118, is passed to the boiler house, not shown, at the rate of 74,744 pounds per hour. The remaining portion of water condensate in line 118 is passed by means of line 141 into steam drum 142. From the bottom of the steam drum 142 liquid condensate is withdrawn via line 143, passed through exchanger 105 and then returned to the top of the steam drum via a line 144. The temperature in the steam drum is 324° F. and at a pressure of 80 p. s. i. g. The steam which is present in drum 142 is withdrawn from the top thereof by means of line 146 at the rate of 11,750 pounds per hour.

The product stream, which has been cooled to a temperature of 220° F. by means of cooler 112, is fed into the second cooler 150 by means of line 151 which interconnects coolers 112 and 150. The temperature of the product stream is decreased to 100° F. at a pressure of 55 p. s. i. g. by means of cooler 150, and thence this material passes into a line 153, which connects with the middle section of a gas separator 154. Any water condensate which is present in the product gas is withdrawn from the bottom of separator 154 by means of line 156, and it is transported by means of pump 157 and line 111 of the product gas line 109 to a point just upstream of cooler 112. The product gas of the process is discharged from the top of separator 154 by means of line 158. This product has the following composition and in the amounts specified below:

| Components: | Lb./hr. |
| --- | --- |
| $H_2$ | 2,608 |
| $N_2$ | 12,184 |
| CO | 1,008 |
| A | 224 |
| $CH_4$ | 56 |
| $CO_2$ | 16,042 |
| $H_2O$ | 496 |
| Total | 32,618 |

Having thus described our invention by reference to specific examples thereof, it should be understood that no undue limitations or restrictions are to be imposed by reason thereof, but that the present invention is defined by the following claims.

We claim:

1. A water gas shift reaction which comprises introducing a carbon monoxide gas into the first of a series of stationary spaced beds of water gas shift catalyst under suitable conversion conditions including a temperature between about 650° and 850° F. and injecting liquid water in an amount between about 0.005 and about 0.02 pound per cubic foot of carbon monoxide at inlet conditions into each of the spaces between said beds and into contact with the reactants in order to regulate the reaction temperature and furnish water for the intended reaction.

2. The process of claim 1 wherein three spaced beds are employed and the second and third beds relate to the initial bed in the volumetric ratio of about 1.1 to 2.75:1 and about 2 to 6:1, respectively, and the third bed is larger than the second bed.

3. A process for the production of ammonia synthesis gas under superatmospheric pressure which comprises reforming a hydrocarbon with steam in a first indirectly heated tubular reforming zone at a pressure of about 15 to about 125 p. s. i. g. and at a temperature of about 1250° F. to about 1450° F. to obtain about 60 to 80% conversion of said hydrocarbon, contacting the reaction product from the first reforming zone at a pressure of about 15 to about 125 p. s. i. g. with steam and air under suitable reforming conditions to obtain substantially complete conversion to a reaction product containing nitrogen in the appropriate quantities for ammonia synthesis and carbon monoxide, contacting the product gas from the second reforming zone with a series of stationary spaced beds of water gas shift catalyst under suitable conversion conditions including a temperature between about 650° and 850° F. and injecting liquid water in an amount between about 0.005 and about 0.02 pound per cubic foot of carbon monoxide at inlet conditions into each of the spaces between said beds and into contact with the reactants in order to regulate the reaction temperature and furnish water for the intended reaction.

4. A process for the production of gas for the synthesis of ammonia which comprises contacting a hydrocarbon with steam in a first indirectly heated tubular reforming zone at a temperature of about 1250° to about 1450° F., a pressure of about 15 to about 125 p. s. i. g., in the presence of a reforming catalyst comprising an oxide of a group VIII metal having an atomic number not greater than 28, contacting the product thus produced from the first reforming zone with steam and air in a second reforming zone, at a temperature of about 1500° to about 1900° F., a pressure of about 15 to about 125 p. s. i. g., in the presence of a reforming catalyst comprising an oxide of a group VIII metal having an atomic number not greater than 28, to produce a reaction product containing nitrogen in the appropriate amount for ammonia synthesis and containing carbon monoxide, contacting the reaction product from the second reforming zone with steam in the water gas shift zone with a series of stationary spaced beds of catalyst comprising an oxide of a group VIII metal having an atomic number not greater than 28, at a temperature of about 650° to about 850° F., a pressure of about 15 to about 125 p. s. i. g., and injecting liquid water in an amount between about 0.005 and about 0.02 pound per cubic foot of carbon monoxide at inlet conditions into each of the spaces between said beds and into contact with the reactants in order to regulate the reaction temperature and furnish water for the intended reaction.

5. A process for the production of gas for the synthesis of ammonia which comprises contacting a hydrocarbon with steam in the presence of a polyvalent metal oxide catalyst in a first reforming zone under suitable reforming conditions including a pressure of about 15 to about 125 p. s. i. g., contacting the reaction product from the first reforming zone with steam and air in the presence of a polyvalent metal oxide catalyst in a second reforming zone under suitable reforming conditions including a pressure of about 15 to about 125 p. s. i. g. thus producing a reaction product comprising hydrogen, nitrogen and carbon monoxide, contacting the reaction product from the second reforming zone with a series of stationary spaced beds of water gas shift catalyst under suitable conversion conditions including a temperature between about 650° and 850° F. in a water gas shift zone, injecting liquid water in an amount between about 0.005 and about 0.02 pound per cubic foot of carbon monoxide at inlet conditions into each of the spaces between the catalyst beds and into contact with the reactants in the water gas shift zone in order to regulate the reaction temperature and furnish water for the intended reaction thus producing a gas comprising hydrogen, nitrogen and steam, passing the reaction product from the water gas shift zone to a first cooling zone to condense a portion of the steam, separating the condensed steam from the cooled reaction product, passing the cooled reaction product to a second cooling zone wherein it is further cooled and additional quantities of steam are condensed therein, separating the condensed steam from the cooled reaction product leaving the second cooling zone and recycling the same to the reaction product stream prior to entering the first cooling zone.

6. A process for the manufacture of gas for the synthesis of ammonia which comprises contacting normally gaseous hydrocarbons with steam in the presence of an oxide of a group VIII metal having an atomic number not greater than 28 in a first indirectly heated tubular reforming zone at a temperature of about 1325° to about 1375° F., a pressure of about 50 to about 75 p. s. i. g., the volumetric ratio of steam to hydrocarbon is about 1 to 4:1 thus obtaining 60 to about 80% conversion of the hydrocarbon, contacting the reaction product from the first reforming zone with steam and air in the presence of an oxide of a group VIII metal having an atomic number not greater than 28 in a second reforming zone, at a temperature of about 1650° to about 1750° F., a pressure of about 50 to about 75 p. s. i. g., the volumetric ratio of oxygen to reaction product from the first reforming zone is about .03 to 0.1:1, thus producing a reaction product comprising hydrogen, nitrogen and carbon monoxide, contacting the reaction product from the second reforming zone with a series of stationary spaced beds of catalyst comprising an oxide of a group VIII metal having an atomic number not greater than 28, said second and third beds relate to the initial bed in a volumetric ratio of about 1.1 to 2.75:1 and about 2 to 6:1, respectively, the third bed is larger than the second bed, at a temperature of about 700° to about 750° F., a pressure of about 50 to about 75 p. s. i. g., the volumetric ratio of steam to carbon monoxide in the water gas shift zone is about 3 to 10:1, and injecting liquid water in an amount between about 0.005 and about 0.02 pound per cubic foot of carbon monoxide at inlet conditions into each of the spaces between said beds and into contact with the reactants in the amount of about 0.005 to about 0.02 pound of water per cubic foot of carbon monoxide such that the reaction temperature is regulated and steam is furnished for the intended reaction.

7. The process of claim 6 wherein the catalyst in the first and second reforming zones comprises nickel oxide supported on alumina and the catalyst in the water gas shift zone comprises iron oxide.

8. A process for the production of a reaction product rich in hydrogen and nitrogen under superatmospheric pressure which comprises reforming a hydrocarbon with steam in a first indirectly heated tubular reforming zone at a pressure of about 15 to about 125 p. s. i. g. and at a temperature of about 1250° F. to about 1450° F. to obtain about 60 to 80% conversion of said hydrocarbon, and contacting the reaction product from the first conversion zone at a pressure of about 15 to about 125 p. s. i. g. with steam and air under suitable reforming conditions including a temperature between about 1500° and 1900° F. to obtain substantially complete conversion of the hydrocarbon.

9. A process for the production of the reaction product rich in hydrogen and nitrogen under superatmospheric pressure which comprises contacting a hydrocarbon with steam in a first indirectly heated tubular reforming zone at a temperature of about 1250° F. to about 1450° F. and at a pressure of about 15 to about 125 p. s. i. g. in the presence of a reforming catalyst comprising oxide of a group VIII metal having an atomic number not greater than 28 and contacting the product thus produced from the first reforming zone with steam and air in a second reforming zone at a temperature of about 1500° to about 1900° F. and at a pressure of about 15 to about 125 p. s. i. g. in the presence of a reforming catalyst comprising an oxide of a group III metal having an atomic number not greater than 28 whereby substantially complete conversion of the hydrocarbon is obtained.

10. A process for the manufacture of a gas rich in hydrogen and nitrogen under superatmospheric pressure which comprises contacting normally gaseous hydrocarbons with steam in the presence of an oxide of a group VIII metal having an atomic number not greater than 28 in a first indirectly heated tubular reforming zone at a temperature of about 1325° to about 1375° F., a pressure of about 50 to about 75 p. s. i. g., and a volumetric ratio of steam to hydrocarbon of about 1 to 4:1 to obtain about 60 to 80% conversion of said hydrocarbons and contacting the reaction product from the first reforming zone with steam and air in the presence of an oxide of a group VIII metal having an atomic number not greater than 28 in a second reforming zone at a temperature of about 1650 to about 1750° F. at a pressure of about 50 to about 75 p. s. i. g. and at a volumetric ratio of oxygen to reaction product from the first reforming zone of about 0.03 to 0.1 to 1 to obtain substantially complete conversion of the hydrocarbons.

11. The process of claim 10 wherein the catalyst in the first and second reforming zones comprises nickel oxide supported on alumina.

References Cited in the file of this patent

UNITED STATES PATENTS

| | | |
|---|---|---|
| 1,376,514 | Clancy | May 3, 1921 |
| 1,703,747 | Patart | Feb. 26, 1929 |
| 1,736,065 | Williams | Nov. 19, 1929 |
| 1,816,523 | Gluud et al. | July 28, 1931 |
| 2,135,694 | Bardwell et al. | Nov. 8, 1938 |
| 2,565,395 | Scharmann | Aug. 21, 1951 |
| 2,578,490 | Shapleigh | Dec. 11, 1951 |
| 2,610,106 | Gray | Sept. 9, 1952 |
| 2,631,086 | Moak et al. | Mar. 10, 1953 |
| 2,662,005 | Evans | Dec. 8, 1953 |

FOREIGN PATENTS

| | | |
|---|---|---|
| 343,054 | Great Britain | Feb. 9, 1931 |

U. S. DEPARTMENT OF COMMERCE
PATENT OFFICE
CERTIFICATE OF CORRECTION

Patent No. 2,829,113                                                 April 1, 1958

Martin J. Barry et al.

It is hereby certified that error appears in the printed specification of the above numbered patent requiring correction and that the said Letters Patent should read as corrected below.

Column 3, line 61, after "mm." and before the comma, insert an closing parenthesis; column 6, line 50, for "caatlyst" read -- catalyst --; column 10, line 61, for "group III" read -- group VIII --.

Signed and sealed this 20th day of May 1958.

(SEAL)
Attest:
KARL H. AXLINE
Attesting Officer

ROBERT C. WATSON
Commissioner of Patents